Oct. 20, 1936.   F. M. DAVIS   2,057,939
CRANKSHAFT DRILLING MACHINE
Filed Dec. 27, 1932   6 Sheets-Sheet 5

Oct. 20, 1936.　　　F. M. DAVIS　　　2,057,939
CRANKSHAFT DRILLING MACHINE
Filed Dec. 27, 1932　　　6 Sheets-Sheet 6

WITNESSES
L. E. Kilian
C. L. Waal

INVENTOR
Frank M. Davis,
By R. S. Caldwell
ATTORNEY

Patented Oct. 20, 1936

2,057,939

UNITED STATES PATENT OFFICE 2,057,939

CRANKSHAFT DRILLING MACHINE

Frank M. Davis, Milwaukee, Wis.

Application December 27, 1932, Serial No. 648,945

7 Claims. (Cl. 77—64)

The invention relates to machine tools and more particularly to machines for drilling oil holes in crank-shafts.

An object of the invention is to provide a machine tool in which crank-shafts or other workpieces are rotated in their travel to locate them in various positions for receiving drilling or other tool operations.

Another object of the invention is to provide a machine tool of this character embodying a chain conveyor for the work permitting the work to be loaded and unloaded by the same operator.

A further object of the invention is to provide indexing means for moving and locating the work conveyor in tooling position.

The invention further consists in the several features hereinafter described and claimed.

In the accompanying drawings.

In the accompanying drawings, the numeral 15 designates a machine frame which in the present instance comprises upright parallel side frame members 16 rigidly connected by a pair of shorter inner frame members 17 arranged side by side and extending longitudinally of the frame. The side frame members are also connected by front and rear end frame members 18 and 19 respectively, and are surmounted by a cover frame member 20 having the shape of an inverted rectangular box. A pair of rack-guides 21 are secured in inwardly overhanging relation to the upper walls of the respective side frame members 16 and are spaced above the inner frame members 17. A pair of parallel conveyor-supporting frame members 22 are secured to the inner walls of the respective side frame members 16 and are spaced below the frame members 17. A pair of parallel conveyor-guide bars 23 are secured to the lower and outer portions of the respective frame members 17 and each terminates at its front and rear ends in semi-circular tracks 24 and 25, respectively.

Each of the frame members 17 carries at its upper wall a pair of spaced parallel horizontal toothed racks 26 which extend longitudinally of the machine frame. Each rack is flanked by a track bar 27 which has its track surface tangent to the pitch line of the rack, and each pair of racks are disposed between the corresponding track bars. Each of the frame members 22 carries a grooved horizontal track bar 28 which extends longitudinally of the machine frame and is arranged in a vertical plane extending between the corresponding pair of racks 26.

An endless work conveyor 29 has a horizontal upper flight disposed along the track bars 27 and a horizontal lower flight disposed along the track bars 28. The conveyor comprises side chains 30, the corresponding links of which are rigidly connected by cross bars 31 and are provided with rollers 32 adapted to ride on the track bars 28. The opposite side chains 30 carry a plurality of rotatable work-holders 33 and 34 respectively, journalled in the chain links at their axes of articulation, the work-holders 33 and 34 being arranged in axially aligned pairs. Each of the work-holders 33 and 34 carries a pair of axially spaced gears 35 adapted to mesh with the racks 26, a pair of flanged wheels 36 adapted to ride on the track bars 27 and a pair of diametrically opposite rollers 37 adapted to ride on the semi-circular tracks 24 and 25 and on the track bars 23.

In the present instance the work-holders 33 and 34 are somewhat similar to the stocks of a lathe and are adapted to hold between them work-pieces W, here indicated to be multithrow crank-shafts. Each work-holder 33 is provided with a conically pointed center 38 adapted to enter a recess in the end of the crank-shaft and being retractable against the pressure of the coiled spring 39. A driving dowel 40 is secured to the work-holder 33 to fit a recessed part of the crank-shaft, and a saddle 41 on the work-holder facilitates the loading and unloading of the crank-shaft and also presents an abutment engageable with a shoulder on the crank-shaft for determining the axial position of the crank-shaft. Each work-holder 34 carries a conically pointed center 42 advanced into the adjacent recessed end of the crank-shaft by a screw 43 turned by a handwheel 44. A saddle 45 on the work-holder 34 supports the crank-shaft during the loading and unloading operations. The crank-shaft when in fully mounted position does not rest on the saddles 41 and 45, but is supported on the centers 38 and 42.

The work-conveyor is given an intermittent motion, as hereinafter described, and the crank-shafts are loaded on the conveyor and unloaded therefrom at the front end of the machine, the front end frame member 18 being suitably apertured for this purpose. In the upper flight of the conveyor, the work-holders are rolled along the racks 26 and track bars 27 to various drilling portions, as hereinafter set forth, and in the rest of their travel the work-holders are prevented from turning with respect to the conveyor by the engagement of their rollers 37 with the track bars 23 and the semi-circular tracks 24 and 25.

The crank-shaft exemplified in the drawings is one for an eight-cylinder V-type engine. This crank-shaft has four throws and three main bearings, the two outer crank-pins lying in the same plane but 180° apart and the two inner crank-pins being also 180° apart but lying in a plane at right angles to the first plane. This crank-shaft is to have drilled therein four oil passages 46 for lubricating the four crank-pins, each oil passage extending obliquely from a crank pin to the nearest main bearing.

For drilling these passages, obliquely disposed drilling heads 47, 48, 49 and 50 are mounted on the cover frame member 20 and each extends through a corresponding opening 51 formed in the frame member. Each drilling head comprises a frame 52 carrying an electric motor 53 at its upper end and provided with laterally extending arms 54 adjustably trunnioned in brackets 55 secured to the upper wall of the cover frame member. A pair of parallel guide rods 56 are secured at their upper ends to the arms 54 and at their lower ends to a drill-guiding bar 57 which is trunnioned at opposite ends in brackets 58 adjustably secured to cross bars 59 connecting the frame members 21. In the present instance, each drilling head is provided with two laterally spaced drill chucks 60 carrying drills 61 slidably guided in the bar 57 and adapted to operate simultaneously on a pair of adjacent crank-shafts. The drill chucks are mounted in a suitable gear casing 62 which is slidably carried on the rods 56 and which has a tubular shank 63 slidably received in the drilling head frame 52. The tubular shank 63 has rack teeth 64 formed thereon meshing with a feeding pinion 65 mounted on a horizontal shaft 66, there being a shaft 66 for each drilling head. The shafts 66, which are parallel and lie in the same horizontal plane, are journaled in a gear box 67 where they are provided with pinions 68 meshing with a pair of reciprocatory racks 69 movable in opposite directions. The two front drilling heads are geared to one of these racks and the two rear drilling heads are geared to the other rack.

A hydraulically operated drill-feeding device 70 of well known construction is mounted on the cover frame member 20. The drill-feeding device embodies a hydraulic cylinder 71 and a vertical piston rod 72 which latter in the present instance has diametrically opposite sets of rack teeth 73 meshing with pinions 74 carried on a pair of parallel shafts 75 rotatable in opposite directions, and journaled in the gear box 67. The shafts 75 carry pinions 76 which mesh with the horizontal racks 69 in the gear box and thus transmit motion to the several drilling heads. The drill-feeding device 70 is preferably of a type which advances the drills during each drilling operation in a series of reciprocations, thereby minimizing breakage of the long slender drills and removing the chips. The retraction of the drills is assisted or accomplished by spring counterbalances 77 having chains 78 fastened to the gear casings 62. The counterbalances 77 serve to remove all play or back-lash in the gearing connections of the feeding means, so as to prevent breakage of the slender drills particularly when they cut through the crank-shaft at the end of their drilling movement.

In order to place the crank-shafts in their various drilling positions, means are provided for moving and holding the work-holders. A horizontally extending double-acting hydraulic cylinder 79 is mounted on the front portion of each of the frame members 21 and is disposed longitudinally thereof. The piston rod 80 of each cylinder is secured to a rack 81 which is slidably mounted in a channel 82 extending longitudinally in the corresponding frame member. The frame members 21 are surmounted by respective rack guides 83 within which are journaled respective stub shafts 84 and the opposite ends of a cross shaft 85. Each stub shaft 84 carries a pinion 86 which meshes with the rack 81 therebelow and with an upper horizontal rack 87 parallel thereto slidably mounted in a channel 88 formed in the corresponding rack guide. Each rack 87 is retained in position by a pair of laterally spaced superposed strips 89.

Figures 4, 11, 12:
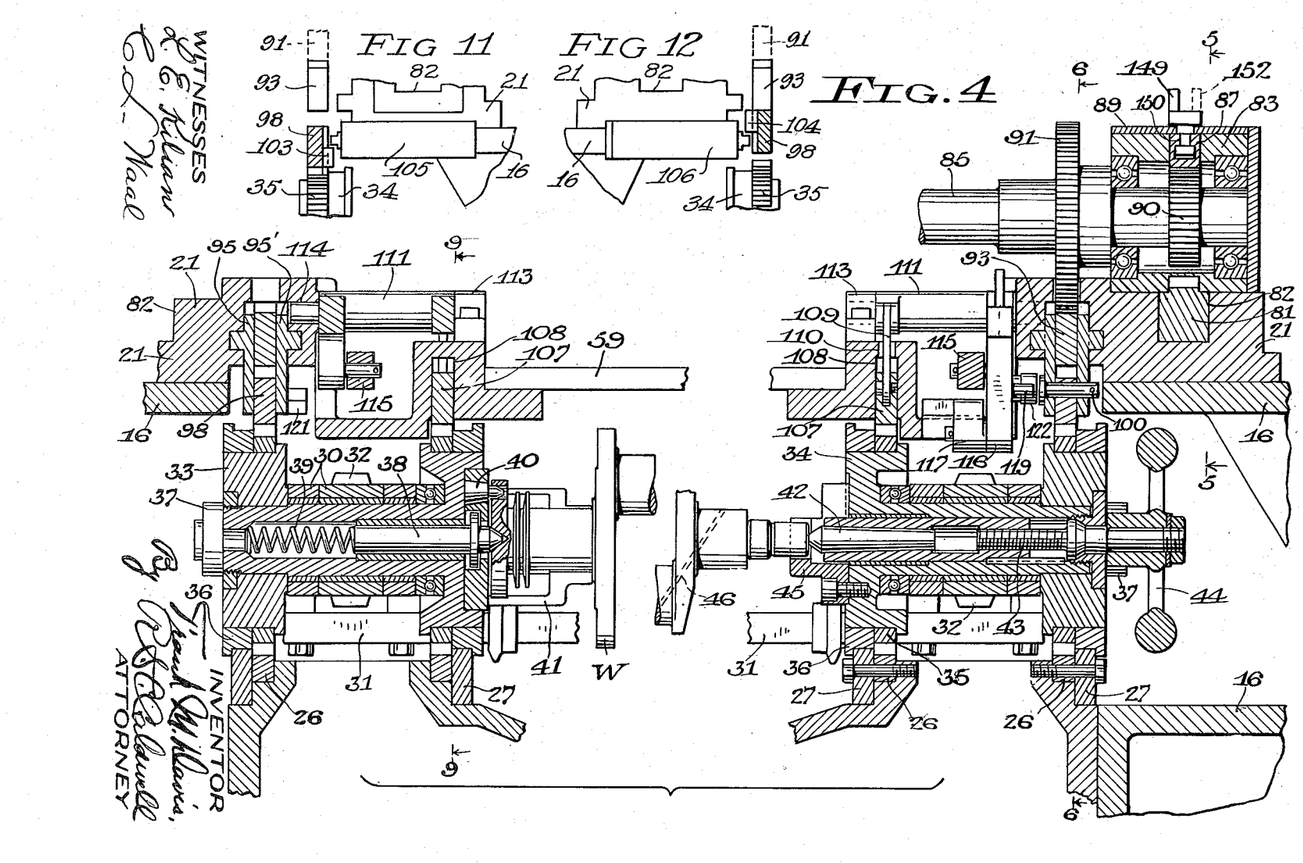
Fig. 4 is a detail sectional elevation taken in the same plane as Fig. 2 and showing the workholding means and its operating mechanism.
Fig. 11 is another detail view of the latch means of Fig. 8, parts being omitted and parts being shown in section, an indexing rack being shifted out of latched position.
Fig. 12 is a view similar to Fig. 11, but showing a second latch means for the indexing mechanism.
Figure 5:
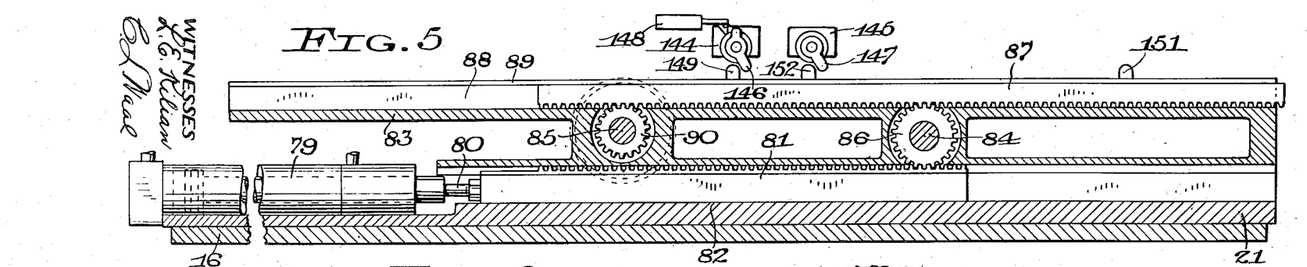
Fig. 5 is a longitudinal section of a hydraulically operated rack mechanism, taken along the line 5—5 of Fig. 4.
Figure 6:
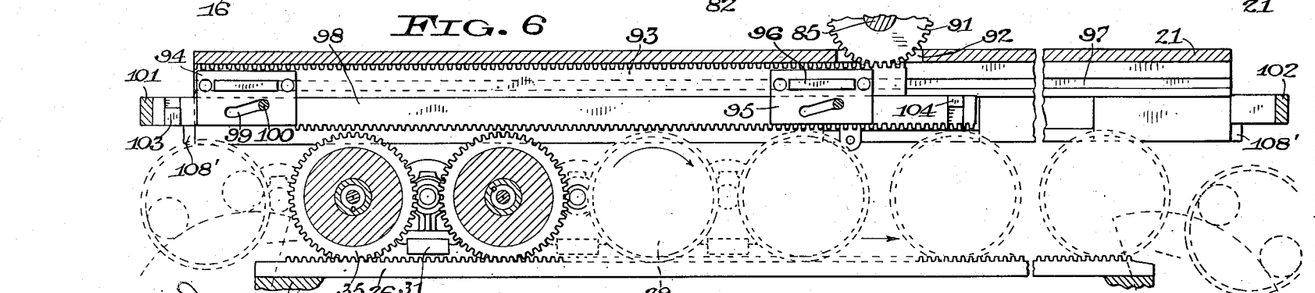
Fig. 6 is a longitudinal section of a conveyor indexing mechanism, taken along the line 6—6 of Fig. 4.

The opposite ends of the cross shaft 85 carry pinions 90 which mesh only with the upper racks 87, as seen in Fig. 5. Near the rack guides 83 the cross shaft 85 carries gears 91, which are somewhat larger than the pinions 90 and which extend through openings 92 in the rack guides 83 and mesh with racks 93, therebelow, as seen in Figs. 4 and 6. A pair of parallel cheek plates 94 and 94' are secured to opposite sides of one end portion of each rack 93 and a pair of somewhat similar cheek plates 95 and 95' are likewise secured to the other end of each rack. The cheek plates have horizontally extending ribs 96 which slidably fit in a pair of opposite grooves 97 formed in the rack guides 21. The racks 93 are thus supported for horizontal reciprocatory movement.

Figure 8:
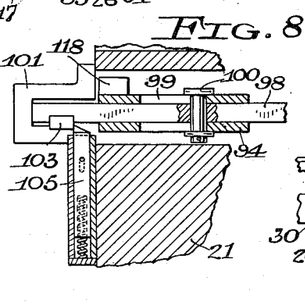
Fig. 8 is a detail top view, partly in section, of a latch means for the indexing mechanism.

Below each rack 93 is disposed an indexing rack 98 flanked at each side by the cheek plates 94, 94', 95, 95'. Each pair of cheek plates is provided with registering inclined cam slots 99 through which passes a pin 100 secured to the indexing rack, the latter rack being thus shiftably supported near opposite ends from the corresponding rack 93. Each indexing rack 98 is meshed during its advancing stroke with the outer gears 35 of the work-holders 33 and 34 in the upper flight of the work conveyor, and is raised out of engagement with these gears during its retracting stroke. The stroke of each indexing rack 98 is limited at opposite ends by stops 101 and 102. Near opposite ends each indexing rack carries laterally projecting latch blocks 103 and 104 which are respectively engageable with spring pressed latches 105 and 106 to releasably retain the indexing rack in terminal positions. As seen in Figs. 6 and 11, the latch block 103 is at the lower portion of the indexing rack 98, and, as seen in Figs. 6 and 12, the latch block 104 is at the upper portion of the rack. The latches 105 and 106 are in the nature of ordinary door or cupboard latches except that no retracting knobs or handles are needed, each latch having a horizontally movable spring-pressed latch bolt or plunger with a beveled nose, as indicated in Fig. 8, showing the latch 105. The latch bolts operate only during latching, the latch blocks being released from the latch bolts by the vertical movement of the indexing rack to bring the blocks out of register with the bolts, as hereinafter described.

Figure 7:
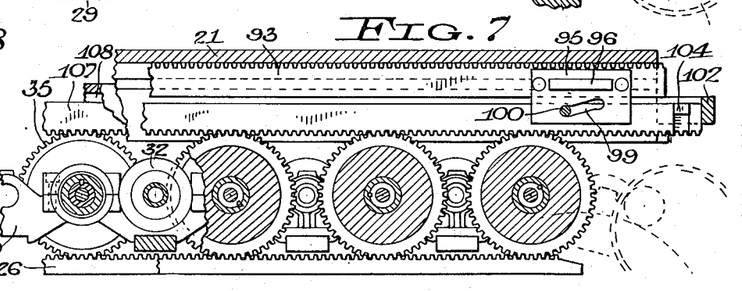
Fig. 7 is a view similar to Fig. 6 showing the indexing mechanism at the end of the indexing stroke.

When each rack 98 is latched in its retracted position, as seen in Fig. 6, it is out of mesh with the gears 35 of the work-holders 33 and 34. When the superposed rack 93 is moved on the initial part of its advancing stroke, the cam action between the cam slots 99 and the pins 100 causes the latched indexing rack to be lowered into mesh with the work-holder gears 35, the latch block 103 sliding downwardly on the projecting latch bolt of the latch 105. As soon as this meshing is effected, the latch block 103 of the indexing rack is lower than and out of register with the latch bolt of the latch 105, as seen in Fig. 11 permitting the indexing rack to be advanced by the rack 93, the pins 100 engaging the rear ends of the cam slots 99, as indicated in Fig. 7. At the end of the indexing stroke the indexing rack strikes the stop 102 and has its latch block 104 engaged by the latch bolt of the latch 106, the latch block in its travel actuating the latch. On the initial part of the return stroke of each rack 93, the latched indexing rack 98 is lifted out of mesh with the work-holder gears 35 by the cam action between the cam-slots 99 and the pins 100, the latch block 104 sliding upwardly on the projecting latch bolt of the latch 106. The latch block 104 of the lifted indexing rack is above and out of register with projecting latch bolt of the latch 105, as seen in Fig. 12, thereby permitting the indexing rack to be moved on its return stroke by the rack 93, during which the pins 100 engage the front ends of the cam slots 99. At the end of its return stroke, the indexing rack strikes the stop 101 and its latch block 103 engages the latch 105, as indicated in Figs. 6 and 8. By means of the latch means above described, the indexing racks 98 will not begin their indexing strokes until they are fully meshed with the work-holder gears 35, and will not begin their retracting strokes until they are raised completely out of mesh with the gears, thus insuring accurate indexing and avoiding noisy operation.

Figure 1:
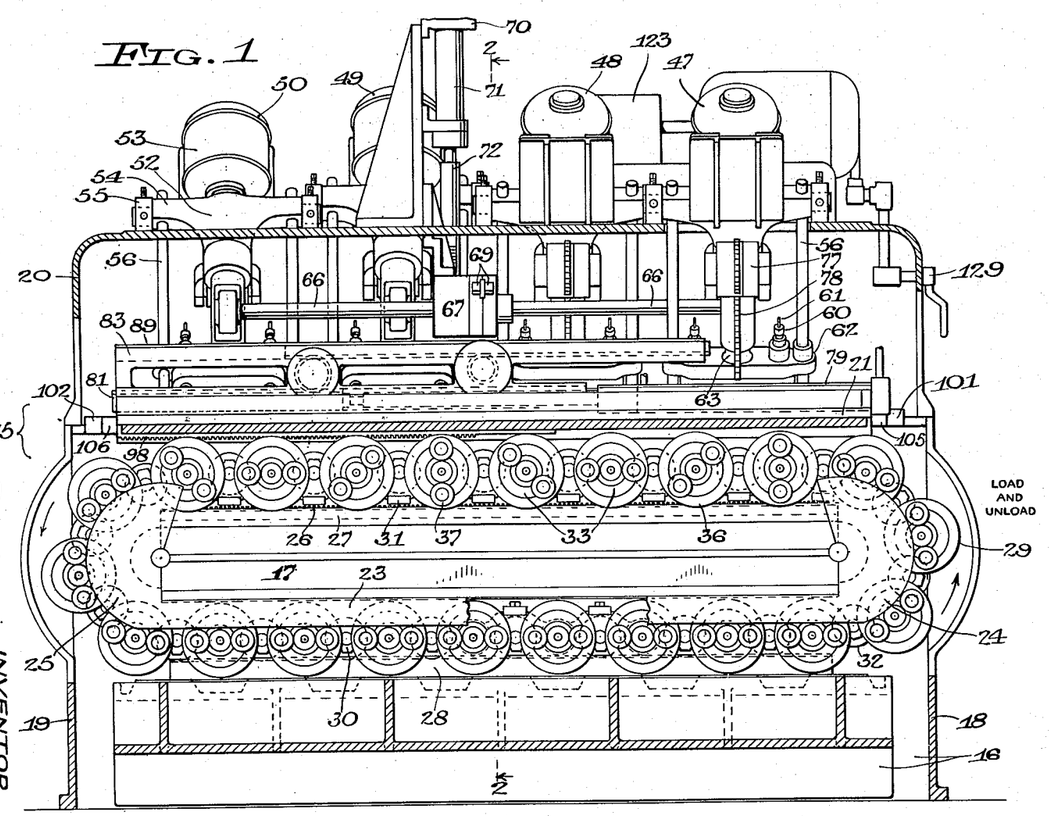
Fig. 1 is a longitudinal sectional elevation of a drilling machine embodying the invention, taken along a plane near one side of the machine.
Figure 2:
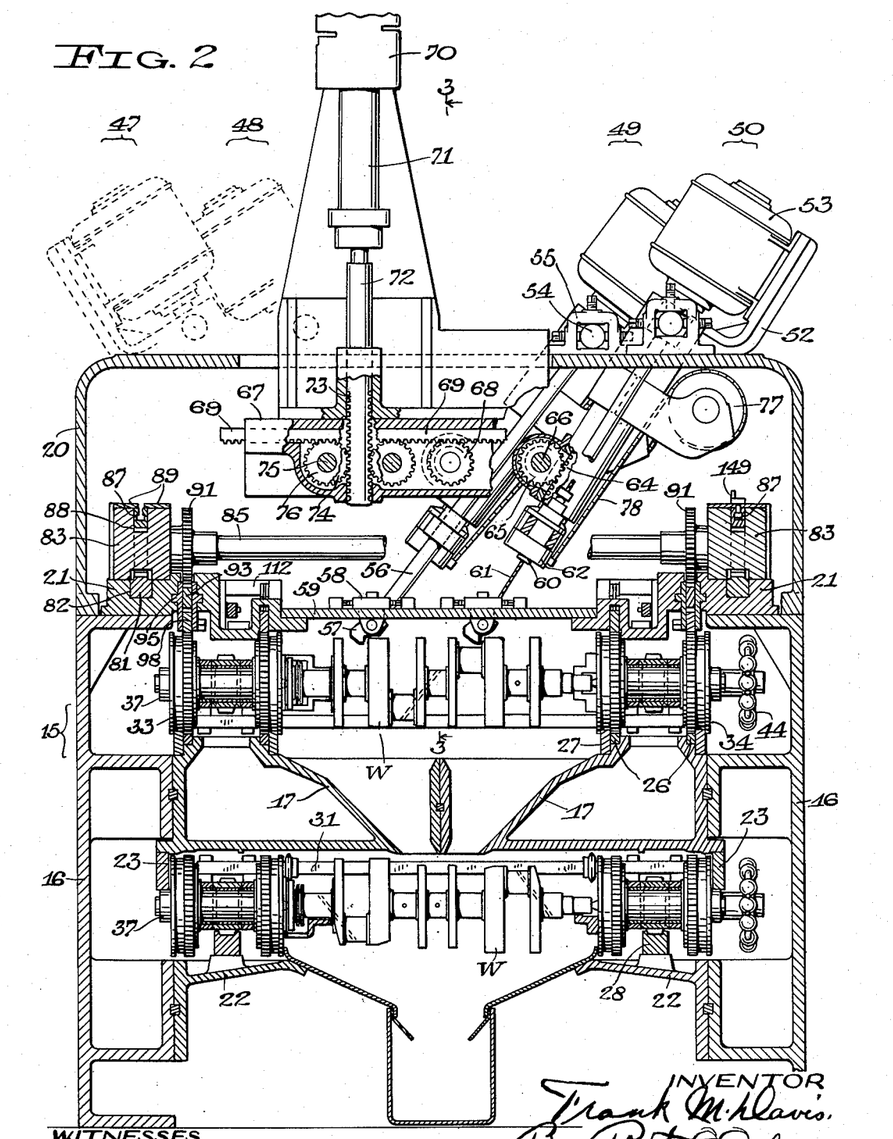
Fig. 2 is a transverse sectional elevation of the machine, taken generally along the line 2—2 of Fig. 1.
Figure 3:
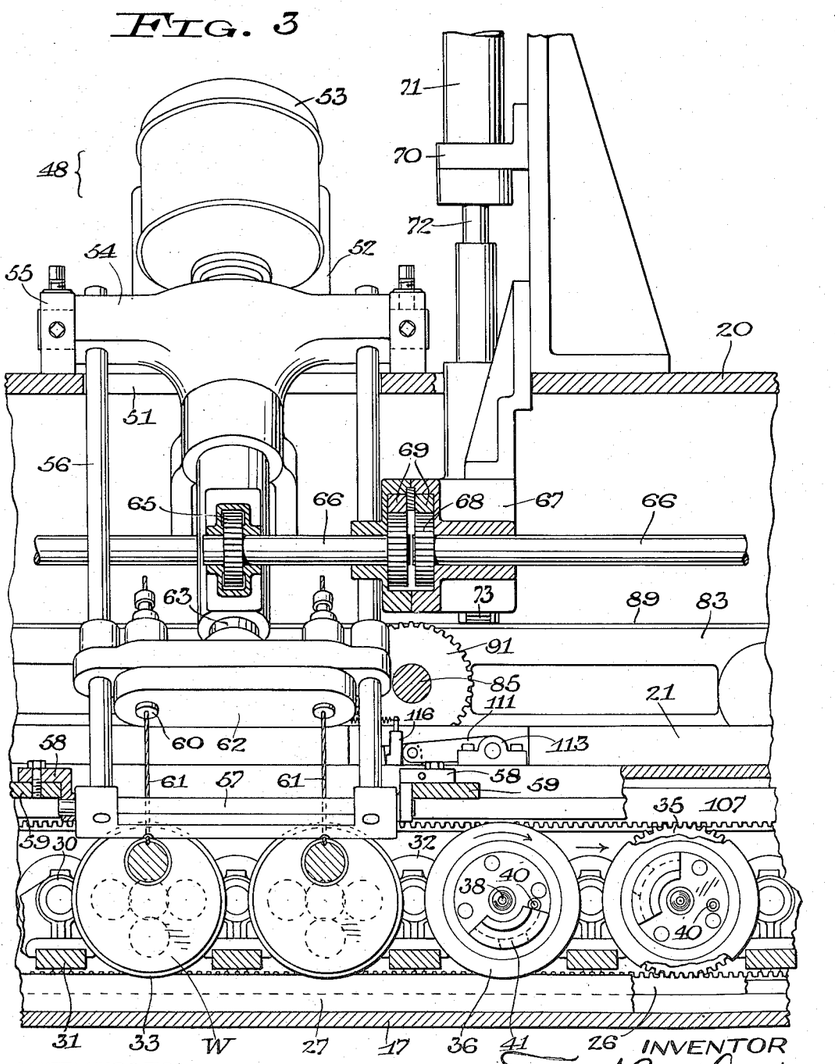
Fig. 3 is a sectional elevation taken along the line 3—3 of Fig. 2.

By the advancing movement of the indexing rack 98, the crank-shafts W on the upper flight of the work conveyor are brought into accurate registration with the superposed drills 61 of the drilling heads 47, 48, 49, and 50. In the present instance, the work-holders are rotated three-quarters of a revolution in each step of their advancing travel. As seen in Fig. 3, the two crank-shafts under the two drills of each drilling head are arranged in the same position, the driving dowels 40 in the work-holders 33 being suitably located to obtain this relation. The stroke of the indexing cylinders 79 is substantially shorter than the stroke of the indexing racks so as to provide compactness of construction.

Figure 9:
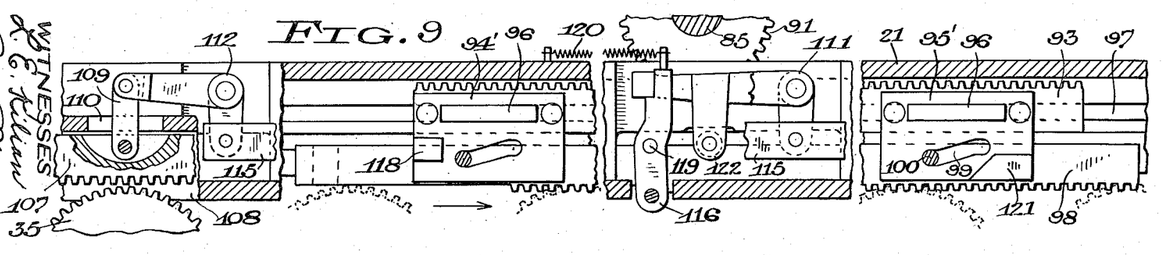
Fig. 9 is a sectional elevation of the indexing mechanism taken generally along the line 9—9 of Fig. 4.

In order to lock the work-holders in their several drilling positions, horizontal locking racks 107 are provided to releasably mesh with the upper portions of the inner gears 35 on the work-holders 33 and 34. The locking racks are slidably mounted for vertical movement in slots 108 formed in the rack guides 21 and are suitably retained against longitudinal shifting, as by blocks 108' at the ends of the slot 108. The locking racks are supported and actuated by links 109 passing through openings 110 in the rack guides 21 and connected to levers 111 and 112 journaled in bearings 113 and 114. A lever 111 is arranged near the middle portion of each locking rack, and a pair of levers 112 are arranged near opposite ends of the locking rack, the former lever and one of the latter levers being shown in Fig. 9. Each set of locking levers have substantially horizontal arms supporting the links 109 and downwardly projecting arms connected by a reach rod 115 for securing simultaneous movement. During the movement of the work conveyor, the locking rack is held out of mesh with the work-holder gears by a trip lever 116 pivotally supported at its lower end on a bracket 117 and having a shouldered upper end engageable with the lever 111, as best seen in Fig. 9. Each cheek plate 94' carries a lug 118 which at the end of the indexing stroke strikes a pin 119 on the trip lever 116 to swing the latter against the action of the spring 120 out of supporting engagement with the lever 111. The locking racks 107 are thus permitted to descend by gravity into mesh with the work-holder gears where they remain during the drilling operations. Each cheek plate 95' carries a cam lug 121 which at the end of the return stroke of the indexing rack strikes a roller 122 on the lever 111 to swing the lever to unlocking position. The trip lever 116 is thereby restored by its spring 120 to the position seen in Fig. 9, where it holds the locking rack 107 out of locking position during the following indexing movement of the work conveyor.

Figure 10:
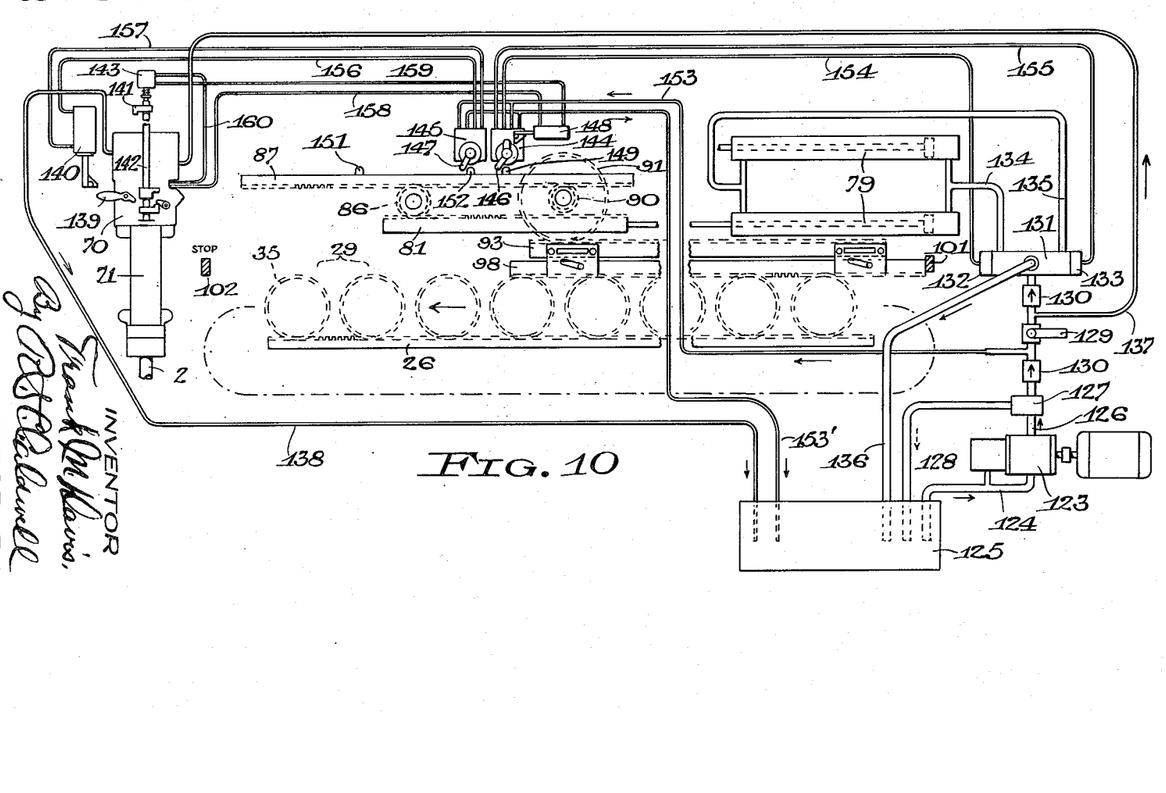
Fig. 10 is a schematic diagram of a hydraulic operating means for the machine.

Suitable means are preferably provided for coordinating the functioning of the conveyor means and the drilling means to obtain automatic operation. In the present case, this is done by a hydraulic controlling system. A motor-driven oil pump 123 draws oil through a pipe 124 from a tank 125 and forces the oil under pressure into a delivery pipe 126. A by-pass 127 in the delivery pipe diverts excess oil back to the tank 125 through a pipe 128. The delivery pipe also includes a manually operated shut-off valve 129 and one or more check valves 130, the valve 129 being mounted at the front end of the machine near the attendant's station. The pipe 126 conducts oil to a four-way valve 131 which embodies two hydraulic actuators 132 and 133 for directing the outward flow of oil alternately through pipes 134 and 135 leading to opposite ends of the hydraulic conveyor-operating cylinders 79, the latter being connected in parallel. The outgoing oil displaced in these cylinders is conducted back to the valve 131 through the pipes 134 and 135 and is discharged to the tank 125 through a pipe 136.

A pipe 137 leads from the delivery pipe 126 to the drill feeding device 70, and a return pipe 138 leads from this device back to the tank 125. The drill-feeding device includes a controlling valve 139 which is moved to "on" position by a hydraulic trip cylinder 140 and moved to "off" position at the conclusion of each drilling operation by a trip 141 carried on a rod 142 movable downwardly with the piston rod 72 during each drilling operation. At the upper end of its travel the rod 142 opens a valve 143 which is connected as hereinafter described.

A pair of four-way control valves 144 and 145 are suitably mounted above the one of the racks 87 of the conveyor feeding mechanism and are provided with respective trip levers 146 and 147. The trip lever 146 is arranged to be swung in opposite directions by a hydraulic trip cylinder 148 and by a trip finger 149 adjustably secured to the rack 87, the latter having a longitudinal undercut clamping groove 150. The trip lever 147 is arranged to be swung in opposite directions by a pair of trip levers 151 and 152 secured to the rack 87. A pipe 153 conducts oil under pressure from the pump delivery pipe 126 to the valves 144 and 145, and an oil return pipe 153' leads from these valves to the tank 125. Pipes 154 and 155 connect the control valve 144 with the hydraulic actuators or relays 132 and 133, respectively, of the valve 131. Pipes 156 and 157 connect the control valve 145 with the hydraulic trip cylinder 140 of the drill-feeding device 70. The trip cylinder 148 of the control valve 144 is connected by a pair of pipes 158 and 159, the former of which leads to the interior of the drill-feeding device and the latter of which leads to the valve 153 on this device. A pressure pipe 160 leads from the interior of the drill-feeding device to the valve 143.

In operation, the attendant loads successive crank-shafts W on the work conveyor through the apertured end frame member 18, each crank-shaft being rested, if necessary, in the work-holder saddles 41 and 45 while it is mounted in place on the work-holders. At the end of each drill-feeding operation, the rod 142 of the drill-feeding device, returns to its uppermost position where it opens the valve 143. Oil is admitted by the valve 143 through the pipe 159 to the trip cylinder 148 of the control valve 144, thus swinging the trip lever 146 of the latter valve to one of its positions. Oil is thereby directed by the control valve 144 through the pipe 155 to the actuator 133 of the valve 131, thus permitting oil to flow through the pipe 135 to move the pistons of the oil cylinders 79 on their retracting strokes. The movement of each of these pistons is communicated to the corresponding indexing racks 98, as hereinbefore described, Figs. 4 to 8, through the cylinder rack 81, pinion 86, rack 87, pinion 90, shaft 85, gear 91, rack 92, and cheek plates 94, 94', 95, and 95'. The locking racks 107 are not released from the work-holder gears 35 until the unmeshed indexing racks 98 reach their retracted positions. As the rack 87 approaches its extreme position, the trip finger 152 thereon swings the trip lever 147 of the control valve 145 to direct the oil flow through the pipe 157 for retracting the piston of the trip cylinder 140.

At the end of the retracting movement, the trip finger 149 on the rack 87 moves the trip lever 146 of the control valve 144 to its other position, thus placing pressure in the oil pipe 154 and valve actuator 132 to direct oil flow through the pipe 134 for moving the pistons of the oil cylinders 79 on their advancing strokes. The indexing racks 98 are thus moved on their advancing strokes, as hereinbefore described, to not only move the work conveyor a predetermined distance but also to rotate the work-holders to predetermined positions. The indexing racks 98 are latched at the end of the indexing stroke and remain in this condition during the drilling operations.

At the end of the indexing stroke, the trip finger 151 on the rack 87 swings the trip lever 147 of the control valve 145 to drilling position, oil flowing through the pipe 156 to the trip cylinder 140 the piston of which opens the valve 139 of the drill-feeding device 70. The drills are fed in a series of reciprocations, as hereinbefore explained, to form the oblique oil passages 46 in the several crank-shafts. At the beginning of the drilling operation the valve 143 on the drill-feeding device is closed, and oil pressure is applied to the pipe 159 to retract the piston of the trip cylinder 148 of the control valve 144. In the present instance, the drilling heads 47, 48, 49, and 50 drill the oil passages 46 in the following order: from the third crank pin to the center main bearing, from the first crank pin to the front main bearing, from the second crank pin to the center main bearing, and from the fourth crank pin to the rear main bearing. At the end of the drilling operation, the trip 141 on the rod 142 closes the valve 139 of the drill-feeding device 70, and the rack rod 72 and control 142 thereupon return to their uppermost positions, opening the valve 143. The cycle of operation is then repeated. The work-holders leaving the last drilling head roll a short distance onto the semi-circular tracks 25, and are prevented from further rotation with respect to the work-conveyor by the rollers 37 engaging these tracks, the track bars 23, and the semi-circular tracks 24. When the work-holders reach the front end of the work conveyor, the drilled crank-shafts are removed by the attendant and replaced by others to be drilled. Since the work-holders are retained against relative rotation with respect to the conveyor except during their passage along the toothed trackway, they will re-enter the trackway in a pre-determined position insuring proper drilling of the crank-shafts.

The work-holders roll easily and smoothly along their supporting tracks with but little wear, even though they carry heavy crank-shafts.

What I claim as new and desire to secure by Letters Patent is:

1. In a machine tool, the combination of a conveyor, a plurality of rotatable supports on said conveyor each having a gear and adapted to hold a work-piece, tool means for operating on the work-pieces, a stationary rack meshing with said gears, an impelling rack having an operative connection with said supports for rolling said supports along said stationary rack to turn the work-pieces to different tooling positions, means for reciprocating said impelling rack including an actuator having a cam connection with said rack for moving it into and out of operative engagement with said supports on alternate strokes of said rack; and latch means for holding said impelling rack at the opposite ends of its reciprocating travel until said rack is respectively engaged with or released from said rotatable supports by said cam connection.

2. In a machine tool, the combination of a rotatable support having a gear and adapted to hold a work-piece, a toothed track meshing with said gear, tool means for operating on the work-piece, impelling means including a reciprocatory member for rolling said support along said toothed track to turn the work-piece to tooling position, a locking member engageable with said support, an actuator for said locking member, a trip member for holding said actuator in unlocking position, and means on said reciprocatory member for moving said actuator to unlocking position on the retracting stroke and for moving said trip member out of unlocking position at the end of the impelling stroke.

3. In a machine tool for drilling crankshafts and the like, the combination of a conveyor having a plurality of pairs of rotatable supports, each pair being axially aligned and adapted to receive a work-piece between them, a rest on each pair of supports adapted to receive the ends of the work-pieces, centers on each pair of supports for holding and aligning said work-piece, means on at least one of said pair of supports for driving the work-piece, means for moving said conveyor, means for drilling said work-pieces, and means for rotating said supports for turning the work-pieces to drilling positions.

4. In a machine tool, the combination of a rotatable member to be indexed and adapted to hold a work-piece, tool means for operating on the work-piece, a reciprocatory indexing rack having an operative connection with said member to move the work-piece to tooling position, means for longitudinally reciprocating said rack and for moving said rack transversely at its end positions into and out of operative connection with said rotatable member for alternate strokes of the rack, and latch means for holding said rack at the opposite ends of its reciprocatory travel until the rack is connected with or released from said rotatable member by the transverse movement of said rack, said transverse movement releasing the latched rack from said latch means.

5. In a machine tool, the combination of a rotatable member to be indexed and having a gear, a rack to mesh with said gear for rotating said member, means for reciprocating said rack including a reciprocatory actuator having a cam connection with said rack for moving said rack transversely into and out of engagement with said gear during the initial parts of the actuator strokes, and latch means for holding said rack at the opposite ends of its reciprocating travel until said rack is respectively engaged with or released from said gear by said cam connection, the transverse movement of said rack by said cam connection releasing said rack from said latch means.

6. In combination, a reciprocatory member movable longitudinally in opposite directions in different parallel paths of movement and shiftable laterally at the opposite ends of its travel from one path to the other, means for moving said member on advancing and retracting strokes and for shifting said member at the opposite ends of its travel from one path to the other, latch means engageable with said member at an end of the travel of said member for preventing subsequent longitudinal movement of said member until said member has been laterally shifted from one of said paths of movement to the other, said member being releasable from said latch means by the lateral shifting of said member, and work-holding means impelled and positioned by said reciprocatory member in one of the longitudinal paths of movement of said member.

7. Indexing mechanism for a machine tool, comprising a rotatable member to be indexed and having a gear, a reciprocatory indexing rack to mesh with said gear for rotating said member, means for longitudinally reciprocating said rack on indexing and return strokes and for moving said rack transversely into and out of mesh with said gear after said return and indexing strokes, respectively, and latch means for holding said rack at the end of its return stroke until said rack is remeshed with said gear, the transverse movement of said rack releasing said rack from said latch means.

FRANK M. DAVIS.